(12) United States Patent
Cerezo Pancorbo et al.

(10) Patent No.: US 6,508,909 B1
(45) Date of Patent: Jan. 21, 2003

(54) PROCESS FOR MANUFACTURING PRE-CURED PARTS OF COMPOSITE MATERIAL WITH GREEN-APPLIED STIFFENERS

(75) Inventors: Carlos Cerezo Pancorbo, Madrid (ES); Rafael Dominguez Casado, Madrid (ES); Manuel De Castro Nodal, Madrid (ES); Augusto Perez Pastor, Madrid (ES); Aquilino Garcia Garcia, Madrid (ES); Manuel Huertas Garcia, Madrid (ES)

(73) Assignee: Construcciones Aeronauticas S.A., Madrid (ES)

( * ) Notice: Subject to any disclaimer, the term of this patent is extended or adjusted under 35 U.S.C. 154(b) by 146 days.

(21) Appl. No.: 09/625,877

(22) Filed: Jul. 26, 2000

(30) Foreign Application Priority Data

Mar. 7, 2000 (ES) .......................................... 200000551

(51) Int. Cl.$^7$ .............................................. B29C 70/44
(52) U.S. Cl. ................ 156/306.6; 156/245; 156/285; 264/257; 264/258; 264/313; 264/319; 264/334; 264/DIG. 42; 425/440
(58) Field of Search ................................ 264/116, 241, 264/260, 263, 257, 258, 313, 316, 334, 645, 512, 513, 515, 136, 137, 171.26, 246, 247, 250, 251, DIG. 42, 319; 156/245, 306.6, 91, 285; 244/123, 124, 126; 425/389, 440, 442; 249/128

(56) References Cited

U.S. PATENT DOCUMENTS

| | | | | |
|---|---|---|---|---|
| 4,882,118 A | * | 11/1989 | Megarry | 249/155 |
| 5,242,523 A | | 9/1993 | Willden et al. | 156/285 |
| 5,593,633 A | * | 1/1997 | Dull et al. | 156/285 |
| 6,245,275 B1 | * | 6/2001 | Holsinger | 249/127 |
| 6,306,239 B1 | * | 10/2001 | Breuer et al. | 156/245 |

FOREIGN PATENT DOCUMENTS

| | | |
|---|---|---|
| DE | 3739753 | 6/1989 |
| DE | 19832441 | 1/2000 |
| FR | 2440831 | 6/1980 |

* cited by examiner

*Primary Examiner*—Michael W. Ball
*Assistant Examiner*—Justin Fischer
(74) *Attorney, Agent, or Firm*—Ladas & Parry

(57) ABSTRACT

A process for manufacturing pre-cured parts of composite material with green-applied stiffeners, comprising the lamination of superimposed pre-impregnated composite material sheets to obtain a base part (1) and a second part (2) intended to be bonded with it; curing the base part (1); hot forming the laminate destined to form the second part (2); removing the second part (2) from the forming tool thereof and deposit it over the base part (1), intercalating a structural adhesive sheet between both of them; closing the assembly of both parts inside a vacuum bag and loading said bag in an autoclave, carrying out a curing cycle of the second part (2) under pressure and temperature, so that it is strongly adhered to the base part (1). The invention is applicable to the field of aeronautics.

19 Claims, 3 Drawing Sheets

PROCESS FOR MANUFACTURING PRE-CURED PARTS OF COMPOSITE MATERIAL WITH GREEN-APPLIED STIFFENERS

FIELD OF THE INVENTION

The present invention refers to a process for manufacturing pre-cured parts of composite material with green-applied stiffeners, in which at least two parts manufactured in composite materials are structurally bonded, of which a first part called base part or support is cured and a second part called stiffener is in green condition and in which the bonding of both parts is carried out by means of a structural adhesive sheet in such a way that the second part is compacted against the first part, with adequate crosslinking of the resin of its composite material and so strongly adhered to the skin of the first part that the adequate resistance of the adhesive sheet is assured.

More specifically, the object of the invention is to develop the necessary theoretical concepts and their corresponding manufacturing processes to obtain a bonding system by co-gluing two or more structural parts manufactured from composite materials.

The bond is carried out by means of autoclave curing of a structural adhesive sheet interposed between two surfaces of parts made of composite material. The resin is cured in one of these parts and green in the other one. The curing of the resin of the part which is in a green condition is also produced in the same autoclave cycle.

One of the most productive industrial applications of the present invention is the manufacture of large size structural members where the quality of the base part is assured, that is, the part arriving already cured to the process.

BACKGROUND OF THE INVENTION

The adhesive joints of structural components have a reduced application in composite materials due to the fact that their use and development degree is limited as corresponds to their recent appearance in the technical background.

In the case of co-gluing, the applicant's closest background refers to the bonding of spar stiffeners of the horizontal stabilizer torsion box for the Airbus A330-340 aircraft (currently in production), the bonding of the longitudinal stiffeners of the skin of the wing torsion box for the CASA 3000 aircraft (in prototype stage), the bonding of spars to the wing skin of the EFA-European Fighter Aircraft (in pre-production phase) and the bonding of the FB.5–1 test box of the LFS-Large Flying-Surfaces development program.

From the results of the previous experiments as well as from other studies and manufacturability tests, it is deduced that the application of the process of the present invention is both achievable and reliable for its use in parts with highly demanded resistant structures and with strict quality requirements.

FIELD OF APPLICATION OF THE INVENTION

This invention is applicable to the manufacture of structural members of composite material parts in which one or several of its components are in a cured condition (base components) and the other components are in a green condition (stiffener components), provided that the bonding between both of them is made. These parts may be any of those belonging to:

Aircraft structures and controls such as flying-surface contours, spars, ribs, fixtures.

Space vehicles.
Marine and land vehicles.
Industrial machinery and equipment.

The manufacturing processes involved are:
Laminating of composite material (manual or automatic).
Cutting of composite material.
Hot forming of composite material.
Handling and positioning of parts and tooling.
Autoclave curing.

The used materials may be integrated by different resins and different types of fibre, such as:
Fiberglass.
Carbon fibre
Kevlar fibre
Boron fibre
Epoxy resin.
Thermoplastic resin
Other heat-stable resins

SUMMARY OF THE INVENTION

The object of the invention is a manufacturing process for composite material parts in which at least one green part is adhered (stiffener component) with another cured part (base component) by means of a structural adhesive. This bonding is obtained by the moulding and pressure application with special tools designed for such purpose, so that it is possible to control and retain the resin and adhesive flow produced during the autoclave cycle.

The green part will have an L- or T-shaped cross section. The process for the latter will be described in detail below.

The cured part may be a wing skin or that of a stabiliser or any other component needing to be stiffened in order to comply with its structural function.

The co-stiffener with a T-shape is confined by devices (angle pieces) which are the basis of the system and which control and retain the resin flow. Afterwards, a vacuum bag is fitted as will be explained later on, and the assembly is introduced into an autoclave to submit it to a curing cycle under a predetermined pressure and temperature depending on the material and part requirements.

The process is applicable to the parts obtained by any lamination process (manual or automatic).

BRIEF DESCRIPTION OF THE DRAWINGS

For a better understanding of the process of the present invention, the attached drawings will be resorted to, where.

DETAILED DESCRIPTION OF THE INVENTION

The manufacturing process developed by the invention and applicable to composite materials is related to a set of different preliminary processes allowing to achieve co-gluing in an optimized way. The key point is the retention of resin flow of the composite material during the co-gluing process described below.

Figure 1:
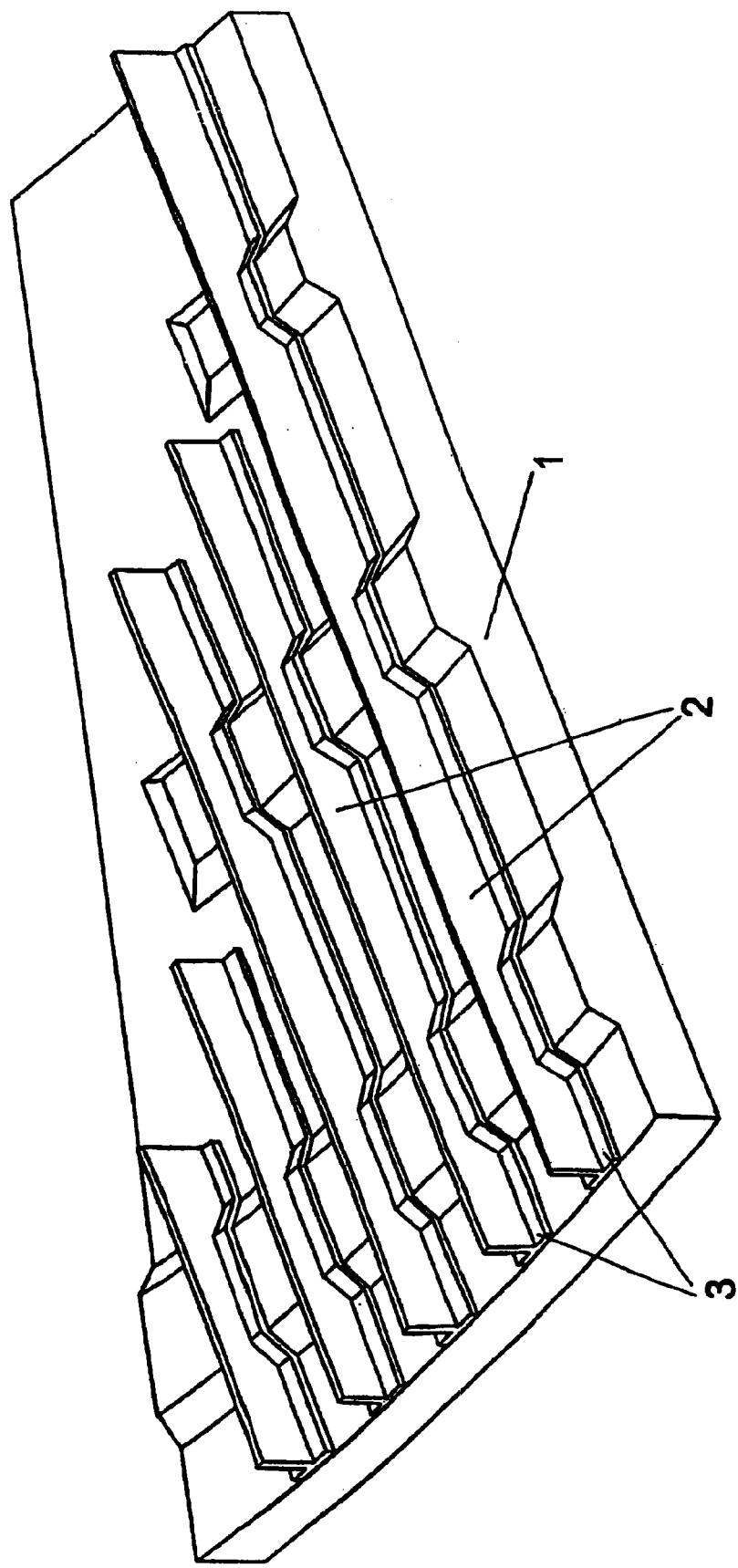
FIG. 1 is a general perspective view of a base skin-stiffener assembly obtained with the process of the invention.

The foot 3 of the stringer 2 is of a constant thickness in each section and is adapted to the shape of the contour of the base part 1, ascending and descending the slopes of the latter as may be observed in FIG. 1. The thicknesses developed until now for such a foot vary between 2 and 8 mm.

Figure 2:
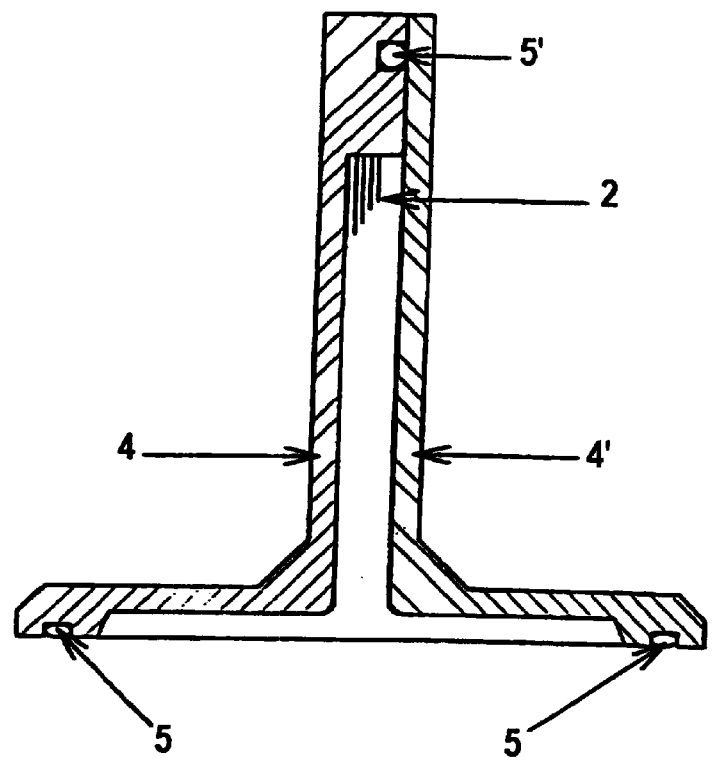
FIG. 2 shows angle pieces used in the present invention.

The stringer 2 is confined between two angle pieces 4, 4' of steel, aluminum, pneumatic cushion, etc., preferably Invar, like those shown in FIG. 2 which are adapted to the shape of the stringer 2. These angle pieces have a series of channels where elastomeric pipes tubes or pipes 5, 5' are housed, retaining the resin flow of the composite material of the stringer 2. The location, shape and exact sizing of such pipes is carried out according to the aforementioned resin flow optimisation and that of the grip-torque over the stringer 2 during the curing process.

Once the stringers 2 have been fitted in the angle pieces 4,4', the adhesive is applied over the feet 3 of the stringers. Then, the assembly is positioned over the base skin (part 1) and the relevant vacuum bag which envelops the entire assembly is made.

With respect to the tooling for the co-gluing process, a cradle over which part 1 has been cured will be used as well as a turning frame which will allow the stringers 2 to be correctly positioned over said part 1. The stringers are fastened to the frame by means of the angle pieces 4,4' described above.

Figure 3:
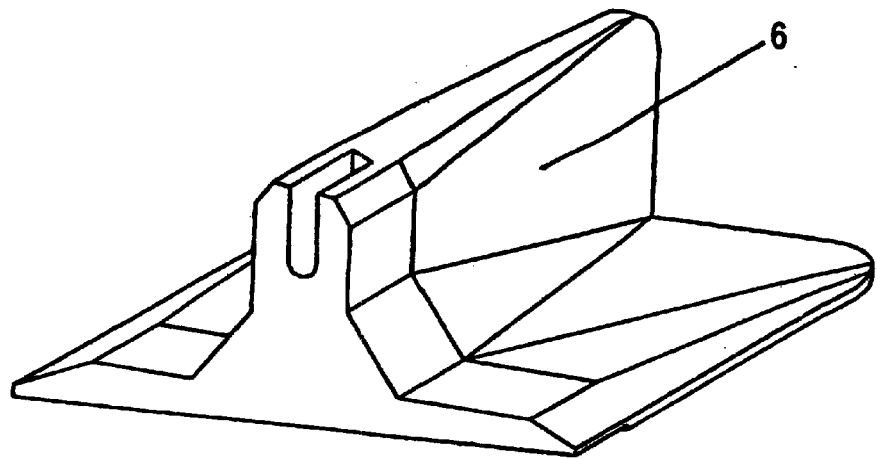
FIG. 3 is a perspective view of a stopper used in the present invention.

To retain the resin flow at the ends, stoppers 6 of steel, aluminium, carbon fibre, etc. are used as shown in FIG. 3.

Now, the different steps of the manufacturing process according to the invention will be described.

A—Lamination of the Part or Parts

Figure 4:
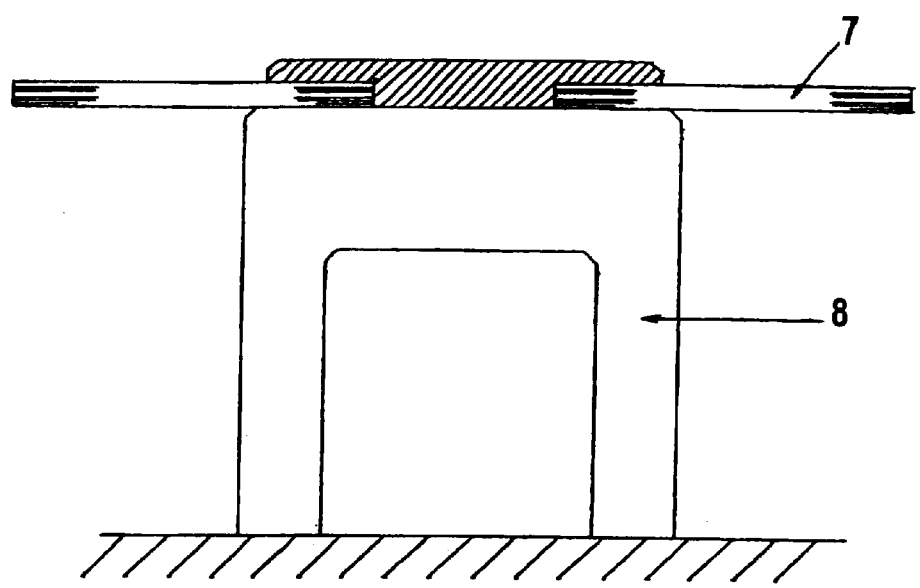
FIG. 4 illustrates the formation of a semi-stringer according to the present invention.

This consists in the superposition of composite material layers in a pre-impregnated condition, so that the orientation of the fibre is adapted to the structural requirements of the part to be manufactured. For such a purpose, the necessary reinforcements will be placed between the different laminate layers, designated with number 7 in FIG. 4. The distribution of layers must be such that their lamination and forming is permitted without producing wrinkles or fibre distortion and also that the part, once cured, has no permanent deformations due to thermal stresses.

On one hand, the base skin (part 1) and on the other hand the assembly of basic stacks forming the stringers 2 are laminated.

The parts made with the present process may be flat or curved, with or without changes of thickness, both transverse and longitudinal. Said parts may be subjected to a posterior cutting according to the convenience of laminating several parts at the same time.

B—Forming of the Stringers and Preliminary Operations

The different laminates 7 forming the semi-stringers 2 are assembled over a bench and introduced in the bed plate of a thermo-forming machine. Control thermocouples are fitted and the tooling parts which may damage the machine membrane are coated with airweave (aerating fabric).

Figure 5:
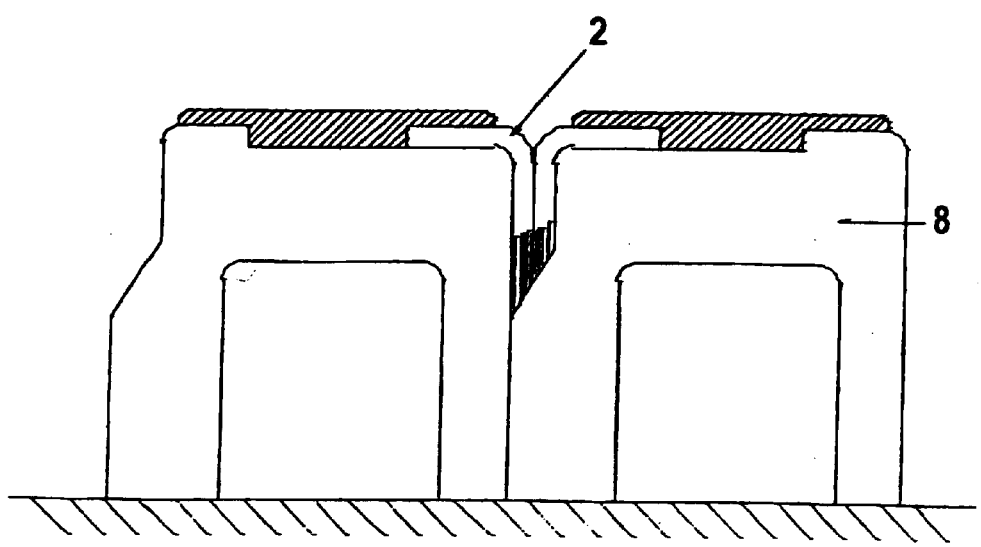
FIG. 5 shows the bonding of the semi-stringers by using the process of the invention.

The hot forming cycle is obtained by applying heat and vacuum. In this way, formed laminates 7 are obtained forming semi-stringers (FIG. 4) over the thermo-forming tools 8; the stringer 2 is obtained by means of bonding the semi-stringers by couples (as shown in FIG. 5).

Due to the thermo-forming tool 8 geometry, the feet 3 of the stringers 2 are adapted to the coating shape of part 1, ascending and descending the slopes existing on it.

C—Assembly on the Turning Frame

The stringers 2 are removed from the forming tools 8 and then introduced in the angle pieces 4, 4' previously fitted in the turning frame.

The angle pieces 4, 4' are tightened and a cradle with the already cured base skin (part 1) on which the reinforcements have been fitted is placed below the 20 frame.

The stringers 2 are turned over part 1, for which the frame is provided with movement and mechanical and optical positioning means permitting to obtain the desired accuracy. Then, the frame is removed and the tightness or sealing is assured to prevent resin of the composite material from flowing outwardly from the stringers and formation of the vacuum bag is started.

The positioning tolerances of the parts between each other and of the latter with the tools are related to the thickness and geometrical characteristics thereof.

D—Autoclave Process Preparation

Once the green parts or stringers 2 and their tools 8 have been positioned over the cured base skin (part 1), the vacuum bag is prepared, for which three layers of different materials will be used. In the last layer, a series of perforations will be made to locate valves which will extract air from the bag, hence obtaining the required vacuum. The bag will remain sealed to the tool, preventing loses thanks to a strip of mastic fitted around the perimeter. To assure tightness, the bag will be tested once cold.

Re-usable bags of silicone, etc. may also be used.

E—Autoclave Curing

After preparing the vacuum bag, the assembly is loaded over the autoclave support tool. This is hermetically closed and the corresponding curing cycle is carried out rating the value of the following essential parameters, depending on the characteristics of the material and the part:

Pressure: 5.95–10.5 kg/cm$^2$.

Temperature: up to 190° C. according to the material.

Rate of heating: 0.5–2° C./min.

Once the autoclave chamber reaches the environmental conditions of pressure and temperature, the already cured and perfectly consolidated material is removed. The parts initially in a pre-impregnation condition (stringers 2) are now perfectly adhered to the cured component (part 1) and in a condition to support the structural stresses for which they have been designed.

As already described in its different stages, in the process of the present invention, the key factor lies in retaining the resin flow of the composite material of the stiffener (stringer 2) during the curing process, for which the previously described gluing process is applied, in which the stringer 2 is confined between two steel, aluminium, pneumatic cushion angle pieces 4, 4' etc., like those shown in FIG. 2, the latter having a series of elastomeric components (elastomeric pipes 5, 5') which are those retaining the resin flow.

The process of the invention is applicable for different thickness (3.5–16 mm for the core and 2 to 8 mm for the stiffener foot, spar and/or stringer) and for different laminates 7. The dimensions are very variable, both in height and length. Until now, parts reaching a 17 m length with suitable tooling have been developed.

The basic features of the invention have been remarked above, although, as will be understood, it will possible to make amendments of certain details of the manufacturing process developed by the applicant. For this reason, it is intended that the scope of the invention is limited only by the contents of the attached claims.

What is claimed is:

1. A process for manufacturing a structural member from pre-cured elements composite material and green stiffeners, wherein at least two parts made of composite materials consisting of fibers and resin are structurally bonded, in which a first part, called a base part or support, is in a cured condition; and a second part, called a stiffener, is in a green condition and wherein the bonding of both parts is carried out by means of a structural adhesive sheet, so that the second part is compacted against the first part, with crosslinking of the resin of the composite material of the second part and adhered of the first part through the adhesive sheet said process comprising the following steps:

a) laminating superimposed layers of composite material in a pre-impregnated condition, so that orientation of the fibers adapts to structural requirements of the to be obtained, producing from the resulting laminated layers the base part (1) on the one hand, and on the other hand, an assembly of basic stacks of laminated layers (7) destined to form the second part (2);

b) curing the base part (1) obtained in step a);

c) mounting the laminated layers (7) destined to form the second part (2) on a bench and introducing the bench and the laminated layers mounted thereon in a thermo-forming machine with a thermo-forming tool (8) and carrying out a hot forming cycle by applying heat and vacuum, to obtain halves of the second part (2) which halves are then bonded to each other to form the complete second part (2);

d) removing the second part (2) from the thermo forming tool (8) and introducing said second part (2) in angle pieces (4,4') previously fitted over a turning frame, said angle pieces being provided with a plurality of channels in which a plurality of elastomeric pipes (5,5') are housed for retaining resin in the composite material of said second part (2), applying a structural adhesive sheet to the second part (2) in an area where said second part (2) is to be bonded to the base part (1), tightening the angle pieces (4, 4') against the laminate layers of said second part (2) and placing a cradle with the already cured base part (1) beneath the turning frame, turning the turning frame so that said second part (2) is over the base part (1) and removing the turning frame and e) once the second part (2) has been positioned over the already cured base part (1), enclosing the assembly of said base part (1) and said second part (2) with said angle pieces (4, 4') thereon inside a vacuum bag and sealing the latter by means of a mastic strip fitted around its perimeter; thereby assuring tightness to prevent resin of the composite material of the second part (2) from flowing outwardly from said second part;

f) loading the enclosed assembly inside the vacuum bag in a chamber of an autoclave support tool, closing the latter hermetically, carrying out a curing cycle of the second part (2) under pressure and temperature and then allowing the autoclave chamber to reach pressure and room temperature conditions again, after which the assembly formed by the previously cured base part (1) and the second part (2), now cured, and adhered to said base part (1), is removed from the autoclave.

2. A process according to claim 1, wherein base part (1) is bonded to two or more second parts (2) to obtain the structural member.

3. A process according to claim 1, wherein to laminate several parts at the same time, the laminated layers (7) obtained in step a) are subjected to later cutting into the several parts.

4. A process according to claim 1, wherein the laminated layers are formed (7) is obtained in a flat or curved shape, with or without changes of thickness, both transverse and longitudinal.

5. A process according to claim 1, wherein the curing in step f) is carried out at a pressure of 5.95–10.5 kg/cm$^2$ and at a temperature of up to 190° C., depending on the composite material, with a heating rate of 0.5° C./min–2° C./min.

6. A process according to claim 1, wherein said pre-cured parts are configured to be applicable in aerospace, marine and land vehicle structures and controls are obtained, as well as and in industrial machinery and equipment.

7. A process according to claim 1, wherein the base part (1) consists of a skin of an aircraft wing, or stabiliser which is stiffened to comply with its structural function.

8. A process according to claim 1, characterised in that the second part (2) has an L- or T-shaped transverse section.

9. A process according to claim 1, wherein the second part (2) comprises a foot and a core and has a thickness from 2 to 8 mm in the foot and from 3.5 to 16 mm in the core said structural member having a length of up to 17 m.

10. A process according to claim 1, wherein a re-usable bag of silicone is used as the vacuum bag in step e).

11. A process according to claim 1, wherein the vacuum bag in step e) is formed with three layers of different materials, in the last of which a series of perforations are made to receive valves to extract air from the bag for obtaining the required vacuum.

12. A process according to claim 1, wherein said fibers of said composite material are selected from fiberglass, carbon fibre, Kevlar fibre, or boron fibre, and said resins are heat stable resins selected from epoxy resin, thermoplastic resin.

13. A process for manufacturing a structural member comprising providing a pre-cured first part of a structural member, said first part being made of a composite material consisting of fibres and resin providing a green part for stiffening the pre-cured first part, said green part comprising a composite of fibres and resin, said green part being formed by laminating a plurality of layers of said composite in which the fibres are impregnated with said resin, and thermo-forming said plurality of layers to obtain a second part for said structural member, said second part comprising a foot and a core, applying angle pieces onto said second part to cover said core and an upper face of said foot while leaving a lower face of said foot exposed, providing channels in said angle parts with elastomeric tubes in said channels applying a sheet of structural adhesive to said lower face of said foot applying the sheet of structural adhesive on the lower face of the foot against said first part and pressing said angle pieces against said second part such that said elastomeric tubes form seals to prevent flow of said resin from said second part, and curing said second part under pressure and heat while also effecting bonding of said second part to said first part by said adhesive sheet to obtain said structural member.

14. A process according to claim 13 comprising placing said first and second parts in a sealed vacuum bag before curing said second part under heat and pressure.

15. A process according to claim 13 wherein the curing of the second part is effected in an autoclave.

16. A process according to claim 13 wherein said angle pieces are applied to said second part to seal the angle pieces against one another and to seal the angle pieces against said first part when the sheet of adhesive is applied on said first part.

17. A process according to claim 13 wherein the lower face of the foot of the second part and said first part are formed with surfaces of corresponding shape.

18. A process according to claim 13 wherein said first part forms a skin of a box-beam of an aerodynamic structure and said second part forms stiffening means for said skin.

19. A process according to claim 14 wherein said vacuum bag is made of a silicone material in order to be re-usable.

* * * * *